United States Patent
Geridönmez et al.

(10) Patent No.: US 11,905,030 B2
(45) Date of Patent: Feb. 20, 2024

(54) CONTROL DEVICE WITH CONTROL PANEL FOR AIR VEHICLES

(71) Applicant: TUBITAK, Ankara (AR)

(72) Inventors: Fatih Geridönmez, Ankara (AR); Tuğrul Adigüzel, Ankara (AR)

(73) Assignee: TUBITAK, Ankara (TR)

( * ) Notice: Subject to any disclaimer, the term of this patent is extended or adjusted under 35 U.S.C. 154(b) by 668 days.

(21) Appl. No.: 16/758,212

(22) PCT Filed: Oct. 23, 2018

(86) PCT No.: PCT/IB2018/058228
§ 371 (c)(1),
(2) Date: Apr. 22, 2020

(87) PCT Pub. No.: WO2019/082063
PCT Pub. Date: May 2, 2019

(65) Prior Publication Data
US 2021/0214097 A1     Jul. 15, 2021

(30) Foreign Application Priority Data
Oct. 23, 2017 (TR) ................. 2017/16275

(51) Int. Cl.
*G06F 3/048* (2013.01)
*B64D 43/00* (2006.01)
*G06F 3/16* (2006.01)

(52) U.S. Cl.
CPC ............. *B64D 43/00* (2013.01); *G06F 3/167* (2013.01)

(58) Field of Classification Search
CPC ........ B64D 43/00; G06F 3/167; G08G 5/0021
See application file for complete search history.

(56) References Cited

U.S. PATENT DOCUMENTS

| | | | |
|---|---|---|---|
| 3,575,589 A | 4/1971 | Neema et al. | |
| 10,672,280 B1 * | 6/2020 | Barber | ................. G08G 5/0034 |
| 2010/0262319 A1 * | 10/2010 | Gunn | ................. G06F 3/04895 |
| | | | 701/3 |
| 2012/0022720 A1 | 1/2012 | Deleris et al. | |
| 2013/0181448 A1 * | 7/2013 | Larson | ................. B60L 8/006 |
| | | | 290/43 |
| 2016/0272300 A1 * | 9/2016 | Matsui | ................. B64C 13/505 |
| 2017/0121020 A1 * | 5/2017 | Roemerman | ............ B64D 7/00 |
| 2017/0240292 A1 | 8/2017 | Fell et al. | |

FOREIGN PATENT DOCUMENTS

EP        2741198        6/2014

* cited by examiner

*Primary Examiner* — Aleksey Olshannikov
(74) *Attorney, Agent, or Firm* — Crose Law LLC; Bradley D. Crose

(57) ABSTRACT

The present invention relates to a control device with control panel (1) for air vehicles and for controlling the suitability of inputs entered into the control panel (CP) by a pilot in order to operate air vehicle and to give automatic input to the control panel (CP) independent of pilot in the event that predetermined conditions are met.

22 Claims, 1 Drawing Sheet

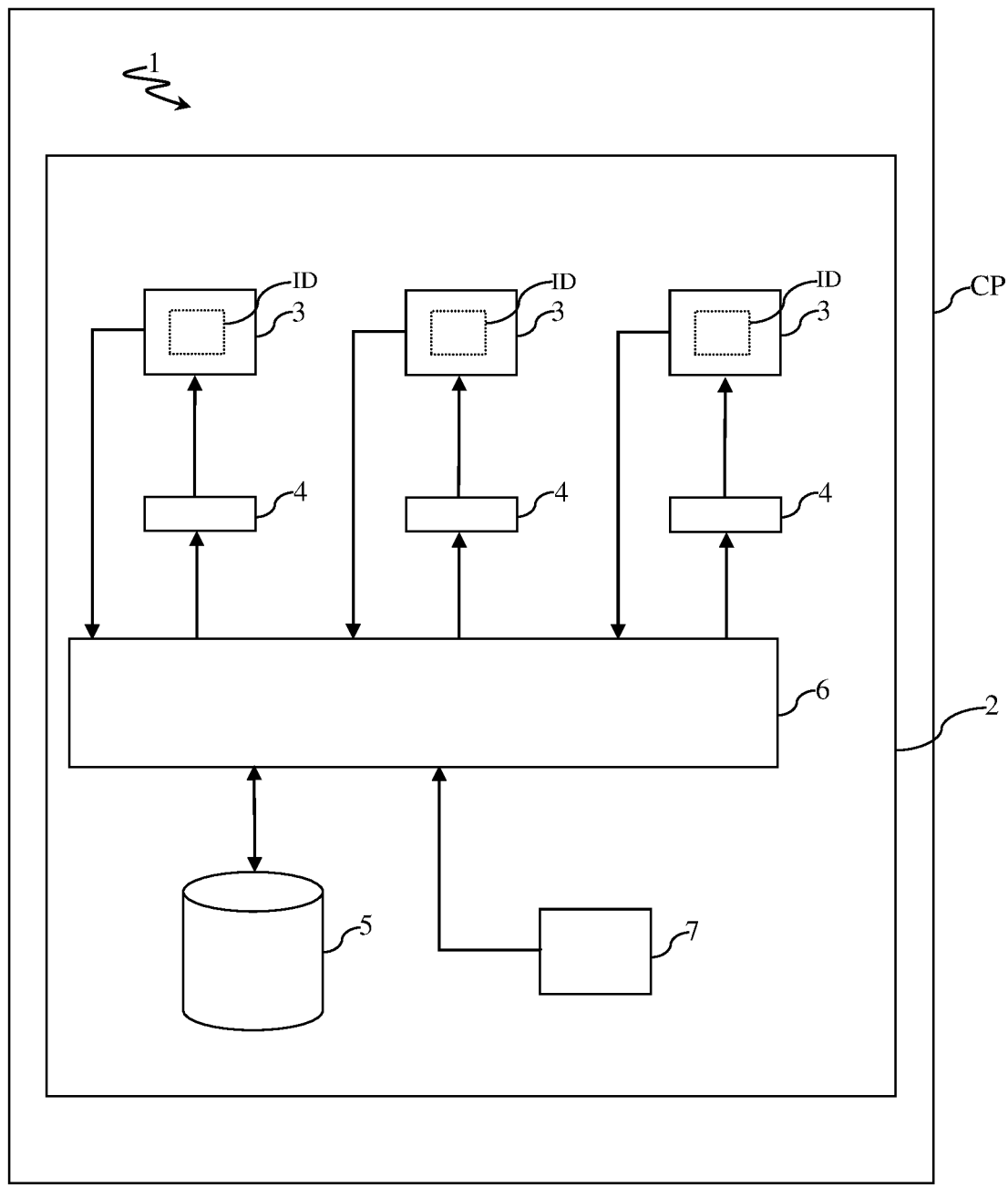

CONTROL DEVICE WITH CONTROL PANEL FOR AIR VEHICLES

TECHNICAL FIELD

The present invention relates to a control device with control panel for air vehicles, which controls the suitability of inputs entered into the control panel by the pilot for the operation of the vehicle and the fulfillment of the desired operation, as well as providing automatic input to the control panel independent of pilot when predetermined conditions are met.

PRIOR ART

In passenger aircraft, jets and similar air vehicles used in military and civil aviation, the operation of the vehicle and the fulfillment of the desired operations are carried out by means of inputs entered into a control panel by the pilot. Said control panels usually include keys and the pilot presses the key associated with that function to perform the desired function.

However, in this case the navigational functions of the air vehicle remain entirely at the discretion of the pilot. If the pilot presses a wrong key, the air vehicle performs a function that the pilot does not want at the moment. For example, in the case of a military jet, if the pilot accidentally presses a button that will fire a fuse within foreign country borders, this is resulting in a crisis that is difficult to repair later on among the countries.

Thus, in the known state of the art, there is a lack of control devices which will allow the pilot to check the validity of entries entered into the control panel of the air vehicle, or even to automatically enter input to the control panel when predetermined conditions are met.

United States patent document no U.S. Pat. No. 3,575,589 mentions an apparatus which detects and identifies errors and shows error correction procedures for several different errors that may occur in an information processing device. With the apparatus; some kind of errors are automatically corrected to protect the operator's control and device awareness and operator is warned to correct some types of errors. The invention can be embodied in a programmable tele-tape device having a central control unit and comprises an input unit, a keyboard unit and a tape unit. In addition to communication and data transfer via the line between the input-output unit and the central control unit, the internal operations of the unit are controlled by process control. In the performance of the first function, the process control cooperates with the process control in the input-output unit which supervises the communication between the keyboard unit and the tape unit. In response to the presence of one or more predetermined conditions monitored at the central control unit and the input-output unit, an error is detected by the error detection circuit, which also identifies the error type detected. This information is transmitted to the error correction detection circuit which directly resolves an error that can be corrected by a specific procedure including one or more digits. This procedure is visually displayed in the form of an indicator or sign on an instrument panel that indicates an error. Generally; it contains the indicator or sign, symbols corresponding to the symbols on the keys or switches of the keyboard unit. The operator sees that an error has occurred when a visual indication is made on the instrument panel. The operator does not have to decide what the error is and how to fix it. In accordance with the present invention, the operator needs keys or switches corresponding to the symbols shown to read the sign in the display panel and immediately correct the error.

European patent application no. EP 2 741 198 A2 discloses a system and method which are provided for employing an intelligent stencil mask to interact with a touch screen interface and thereby reduce the probability of accidental control function activation. Herein, a touch screen interface onboard an aircraft is coupled to a processor and is configured to generate a first virtual mask having a first region and a second region.

Another prior art, US 2012/022720 A1 relates to the software interfaces in data processing systems and more particularly to a method and a device for protecting software commands in an aircraft cockpit, in order to control the execution of software commands through a display and control system.

Another patent application in the state of art, US 2017/240292 A1 discloses aircraft station deselect and cueing systems, and also a method of operating a station deselect safety and cueing system for a flight crew of an aircraft. The method includes identifying when commands are input at a deactivated one of first and second control stations, determining whether the commands input at the deactivated one of the first and second control stations are indicative of normal and intentional piloting inputs and generating control station cues for the flight crew in an event the commands are determined to be indicative of normal and intentional piloting inputs.

BRIEF DESCRIPTION OF THE INVENTION

The aim of the present invention is to implement a control device for air vehicles which has a control panel that allows the pilot to control the suitability of the inputs entered into the control panel by the pilot for the operation of the vehicle and the desired operations.

Another aim of the present invention is to implement a control device with control panel for air vehicles that allows automatic input to the control panel independent of the pilot when predetermined conditions are met.

Another aim of the present invention is to implement a control device with a control panel which allows automatic input to the control panel in the direction of the pilot's voice command.

DETAILED DESCRIPTION OF THE INVENTION

"Control Device with a Control Panel for Air Vehicles" carried out to achieve the purpose of this invention is illustrated in the accompanying FIGURES, from these FIGURES;

FIG. 1A schematic view of the control device with control panel subject of invention;

The parts in the FIGURES are numbered individually and the correspondences of these numbers are given below.

1. Control device with control panel
2. Body
3. Input tool
4. Input tool drive unit
5. Memory unit
6. Processor unit
7. Voice command detection unit
CP: air vehicle control panel
ID: input tool on air vehicle control panel A control device with control panel for air vehicles (1) subject to invention; it includes:

a body (2) having a structure suitable to be placed on the air vessel control panel (CP), several input tool (3) arranged on the body (2) and structured such that it can at least partially match the input tool (ID) located in the control panel (CP), at least one input tool drive unit (4) driving the input tool (3) located in the body (2) and associated with each input tool (3) to transmit the input to the associated input tool (3) to the input tool (ID) located on the control panel (CP), at least one memory unit (5) located in the body (2) for recording input data to be given to the control panel according to predetermined conditions, at least one processor unit (6) located in the body (2) in communication with the input tool (3), the input tool drive unit (4) and the memory unit (5) and structured as follows;

to communicate with the memory unit (4) by sensing the pilot-driven input tools (3), check if input given to input tool (3) which is activated by the pilot in the direction of the data stored in the memory unit (4) is valid input in the present case, if it indicates that the input is a valid input at the end of check, to operate the concerned input tool drive unit (4) associated with the input tools (3) for transmitting said input tools (3) to the control panel (CP) input tool (ID) matching the input tool (3) of the input and if it indicates that the input is not a valid input at the end of check, not to operate the concerned input tool drive unit (4) to inhibit transmission of the pilot-activated input tool (3) to the control panel (CP) input tool (ID) matching the input tool (3) of the input.

The body (2) in the control device (1) which is for control panel of the air vehicles subject of the invention has a structure suitable for being placed on the control panel (CP) of the air vehicles. The body (2) is placed on the control panel (CP) so as to prevent direct access of the pilot to the control panel (CP) input tool (ID) and provide that this access is carried out via the input tool (3) on the body (2). In the preferred application of the body (2), characterized in that it has a box shape holding the input tool drive unit (4), the memory unit (5) and the processor unit (6) and holding the input tool (3) thereon, in a derivative of the preferred application of the invention, the box facing to control panel (CP) is partially open.

The input tool (3) located in the control device (1) which is for the control panel of air vehicles subject to invention is located on the body (2). The input tool (3) has a structure which can at least partially match the input tool (ID) on the control system (CP) of the air vehicles. In the preferred application of the invention, the input tool (3) has the form of a key that matches the input tool (ID), which is the key located on the control panel (CP). In another application of the invention, the input tool (3) is in the form of a control bar that is on the control panel (CP) and that matches the input tool (ID), which is the control bar. In the preferred application of the invention, the input tool (3) is on the body (2) with an equal number of input tool (ID) on the control panel (CP). In the preferred application of the invention, the input tool (3) has an identical pattern or shape on the matching control panel (CP) input tool (ID). In the preferred application of the invention, the input tool (3) sends a data to the processor unit (6) containing information on this when it is desired to be activated by the pilot.

The input tool drive unit (4) in the control device (1) which is for the control panel of air vehicles subject of the invention is located in the body (2) and is in communication with the input tool (3) and the processor unit (6). The input tool drive unit (4) drives the input tool (3) for transmitting the input to the input tool (ID) located on the control panel (CP) if the input entered by the pilot via the input tool (3) is determined to be valid by the processor unit (6). In one application of the invention, the input tool drive unit (4) sends the data to the processor unit (6) containing information on this when the pilot wishes to activate the input tool (3). In one application of the invention, the input tool drive unit (4) is electromechanical. In an alternative application of the invention, the input tool drive unit (4) is solenoidal.

The subject of the invention for air vehicle, the memory unit (5) in the control device (1) is placed inside the body (2) and is communicated with the processor unit (6). In the memory unit (5), data about the functions that the air vehicle can perform based on the current state of the air vehicle, the control panel (CP) input tools (ID) that must be activated to perform these functions, and the input tool (3) data associated with this input tool (ID) are recorded.

The processor unit (6) in the control device (1) which is for control panel of the air vehicles subject of the invention is located in the body (2) and is in communication with the input tool (3), the input tool drive unit (4) and the memory unit (5). In a preferred application of the invention, the processor unit (6) is configured so that it can receive the corresponding data from the input tool (3) when any input tool (3) is desired to be activated by the pilot. In an alternative application of the invention, when any input tool (3) is desired to be activated by the pilot, the processor unit (6) is configured to receive the corresponding data from the input tool drive unit (4). The processor unit (6), after receiving the data about activation of the input tool (3) from input tool (3) and/or input tool drive unit (4), is configured to communicate with the memory unit and to check whether the input is valid or not according to the current operating state of the air vehicle in accordance with the data recorded in the memory unit (5). When the processor unit (6) determines that the input is a valid input as a result of the control operation performed in the direction of the data stored in the memory unit (5), it is configured to operate the input tool drive unit (4) associated with said input tool (3) for the transmission of said input to the control panel (CP) input tool (ID) by input unit (3) to be performed by air vehicle. When the processor unit (6) determines that the input is not a valid input as a result of the control operation performed in the direction of the data stored in the memory unit (5), it is configured not to operate the input tool drive unit (4) associated with said input tool (3) so that it is not transmitted to the control panel (CP) input tool (ID) in order to prevent the input from being carried out by the electronic system or device.

In an application of the invention, the processor unit (6) must be configured so that it is connected to the memory unit (5) after receiving the input data from the input tool (3) and/or from the input tool driver unit (4) when the input tool (3) is to be activated by the pilot, recording together with the date and time tag, in the memory unit (5).

In one application of the invention, the processor unit (6) is in communication with at least one sensor in the air vehicle to determine the current operating state of the air vehicle. The processor unit (6) is configured to receive data regarding the current operating state of the air vehicle from at least one sensor from the input tool (3) and/or from the input tool drive unit (4) before communicating with the memory unit (5) after receiving the data for activating the input tool (3) and to process the data to obtain information about the current state of the air vehicle. The processor unit (6) thus controls the input data validity state in accordance with the current state information of the real-time air vehicle which it determines in the memory unit (5).

In one application of the invention, the processor unit (6) is configured to communicate with at least one sensor within the air vehicle at predetermined periods. In this application, the processor unit (6) is configured to receive data relating to the current operating state of the air vehicle from the at least one sensor during such periods and to process the data to obtain information regarding the current operating state of the air vehicle. The processor unit (6) is configured to connect to the memory unit (5) after obtaining information about the current operating state of the air vehicle and to check whether the electronic system or device has any input matching the determined current operating state information. The processor unit (6) is structured so as not to take any action in the preferred application of the invention unless it can reach any input record in the memory unit (5) as a result of the control operation performed in the memory unit (5). If, in an alternative application of the invention, the processor unit (6) does not arrive at any input record in the memory unit (5) as a result of a control operation performed in the memory unit (5), it is configured so that the data relating to the control process carried out in the memory unit (5) is stored in the memory unit (5) with date and time tags. When the processor unit (6) reaches at least one input record associated with the current operating state of the air vehicle in the memory unit (5) as a result of the control operation performed in the memory unit (5), it is configured to operate the input tool drive unit (4) associated with the input tool (3) required to be activated for performance of said input. At this point, without any pilot intervention, it is ensured that predetermined input is automatically entered by the processor unit (6) to the control panel (CP) according to the current operating status information of the air vehicle. In one application of the invention, when the processor unit (6) reaches at least one input record associated with the current operating state of the air vehicle in the memory unit (5) as a result of the control operation performed in the memory unit (5), it is configured to record the data relating to this process together with the date and time tag in the memory unit (5) after the input tool drive unit (4) associated with the input tool (3) to be activated to perform said input.

In one application of the invention, the control device with control panel (1) for air vehicles subject of the invention further comprises a voice command detection unit (7) in communication with the processor unit (6) in the body (2) for detecting the pilot voice command, configured to transmit the data for the detected data to the processor unit (6). In this application of the present invention, the processor unit (6) is configured to communicate with the memory unit (5) after receiving the data transmitted by the voice command detection unit (7) and check whether the input according to the current state of the air vehicle in the direction of the data stored in the memory unit (5) is valid. If the processor unit (6) determines that the voice input received via the voice command detection unit (7) as a result of the control operation performed in the direction of the data stored in the memory unit (5) is a valid input, it is configured to operate the input tool drive unit (4) associated with the input tool (3) for transmission of said input to the control panel (CP) input tool (ID) by the input tool (3) to realize by air vehicle. When the processor unit (6) determines that the voice input received via the voice command detection unit (7) is not a valid input as a result of the control operation performed in the direction of the data stored in the memory unit (5), it is configured not to operate input tool drive unit (4) associated with said input tool (3) for avoiding transmission to the control panel (CP) input tool (ID) in order to prevent said input performance by air vehicle.

An example application works in this way that in the memory unit (5) of the invention, while the current operational state of the air vehicle is A, information is recorded so that the X and Y inputs can be entered and the Z input can not be entered and while the current operational state of the air vehicle of pilot is A, X and Z inputs respectively wanted to enter in control panel (CP) of air vehicle. The pilot first activates the corresponding input tool (3) to enter the X and Z inputs to the air vehicle control panel (CP). The activated input tool (3) communicate with the processor unit (6) and the processor sends a data on the information that the pilot (6) wants to enter the X and Z inputs. In the preferred application of the present invention, the processor unit (6) receives the current data from the sensor by communicating with at least one sensor included in the air vehicle and processes the data and determines the current operating state of the air vehicle as state A. The processor unit (6) communicates with the memory unit (5) and determines on which the X and Y inputs which can be entered in the state A in the memory unit (5) and the Z input which can not be entered. The processor unit (6) then compares the input interference information X and Z input from the input tool (3) with the input information detected in the memory unit (5), and it decides that the input X is to be performed for the state A but not the input Z for the state A. The processor unit (6) then operates the input tool drive unit (4) associated with the input tool (3), that is connected to the input tool (3) on the body (2) for driving the input tool (ID) on the control panel (CP) and for performing the input X. In addition, since the processor unit (6) decides that the input Z is not to be executed for the state A, it does not operate the input tool drive unit (4) associated with the input tool (3) for avoiding to drive the input tool (ID) that provides performance of input Z and located on the control panel (CP) and for avoiding to drive the input tool (3) which is on the body (2) and has structure matching with the concerned input tool (ID). In one application of the invention, the processor unit (6) records the X and Z input instructions entered by the pilot into the input tool (3) together with the time and date tags in the memory unit (5). In another application of the invention, the processor unit (6) registers the data relating to the input X providing to enter the control panel (CP) and the input Z which prevents to enter together with the time and date tags in the memory unit (5).

In the preferred application of the invention, a control device with control panel (1) for air vehicles is applied on a control panel (CP) which enables the operation of air and ground weapons of warplanes. In this application of the invention, the control device (1) controls the validity of inputs entered by the pilot into the control panel (CP), which provides for the activation of the air and ground weapons and decides whether or not input is performed in line with this control operation.

Around these basic concepts, it is possible to develop a wide variety of applications relating to the invention "Control Device for Control Panels for Air Vehicles" and the invention is not limited to the examples mentioned herein, it is exactly as mentioned in claims.

The invention claimed is:

1. A control device (1) for air vehicles to operate the air vehicle and to control compatibility of inputs entered by a pilot to a control panel (CP) for fulfillment of desired operations and also to enter inputs automatically to a control panel (CP) independent of a pilot when predetermined action are met, characterized by the following:
- a body (2) having a structure for placing on the air vehicle control panel (CP),
- input tools (3) arranged on the body (2), wherein any of the input tools (3) can at least partially cover the input tools on air vehicle control panel (ID), wherein any of the input tools (3) has a form of a key located on the control panel (CP) and/or has a form of a control bar located on the control panel (CP),
- at least one input tool drive unit (4) driving the input tool (3) located in the body (2) and associated with each input tool (3) to transmit the input to the associated input tool (3) to the input tool on air vehicle control panel (ID),
- at least one memory unit (5) located in the body (2) for recording input data to be given to the control panel (CP) according to predetermined conditions,
- at least one processor unit (6) located in the body (2) in communication with the input tool (3), the input tool drive unit (4) and the memory unit (5) and structured as follows;
- to communicate with the memory unit (5) by sensing the pilot-driven input tools (3),
- check if input given to input tool (3) which is activated by the pilot in accordance with the data stored in the memory unit (5) is valid input in the present case,
- if it indicates that the input is a valid input at the end of check, to operate the concerned input tool drive unit (4) associated with the input tools (3) for transmitting said input tools (3) to the input tool on air vehicle control panel (ID) matching the input tool (3) of the input and
- if it indicates that the input is not a valid input at the end of check, not to operate the concerned input tool drive unit (4) to inhibit transmission of the pilot-activated input tool (3) to the input tool on air vehicle control panel (ID) matching the input tool (3) of the input.

2. A control device (1) according to claim 1, wherein the body (2) is placed on the control panel (CP) so as to prevent direct access of the pilot to the control panel (CP) input tool on air vehicle control panel (ID) and provide that this access is carried out via the input tool (3) on the body (2).

3. A control device (1) according to claim 1, wherein it has a box shape holding the input tool drive unit (4), the memory unit (5) and the processor unit (6) and holding the input tool (3) thereon.

4. A control device (1) according to claim 3, characterized in body (2) that it has a box shape holding the input tool drive unit (4), the memory unit (5) and the processor unit (6) and holding the input tool (3) thereon, the box facing to control panel (CP) is partially open.

5. A control device (1) according to claim 1, wherein the input tool (3) has a structure which can at least partially match the input tool on air vehicle control panel (ID) on the control panel (CP) of the air vehicle.

6. A control device (1) according to claim 1, wherein the input tool (3) has an equal number of input tool on air vehicle control panel (ID).

7. A control device (1) according to claim 1, wherein the input tool (3) has an identical pattern or shape on the matching input tool on air vehicle control panel (ID).

8. A control device (1) according to claim 1, wherein the input tool (3) sends a data to the processor unit (6) containing information of the input tool when it is desired to be activated by the pilot.

9. A control device (1) according to claim 1, wherein the input tool drive unit (4) is located in the body (2) and is in communication with the input tool (3) and the processor unit (6).

10. A control device (1) according to claim 1, wherein the input tool drive unit (4) drives the input tool (3) for transmitting the input to the input tool on air vehicle control panel (ID) if the input entered by the pilot via the input tool (3) is determined to be valid by the processor unit (6).

11. A control device (1) according to claim 1, wherein the input tool drive unit (4) sends the data to the processor unit (6) containing information on this when the pilot wishes to activate the input tool (3).

12. A control device (1) according to claim 1, wherein the memory unit (5) is contained within the body (2) and is in communication with the processor unit (6).

13. A control device (1) according to claim 1, wherein the memory unit (5), data about the functions that the air vehicle can perform based on the current state of the air vehicle, the control panel (CP) input tools (ID) that must be activated to perform these functions, and the input tool (3) data associated with this input tool (ID).

14. A control device (1) according to claim 1, wherein the processor unit (6) is located in the body (2) and is in communication with the input tool (3), the input tool drive unit (4) and the memory unit (5).

15. A control device (1) according to claim 1, wherein the processor unit (6) is configured so that it can receive the corresponding data from the input tool (3) desired to be activated by the pilot.

16. A control device (1) according to claim 1, wherein when an input tool (3) that is desired to be activated by the pilot, processor unit (6) is configured so that it can receive the corresponding data from the input tool drive unit (4).

17. A control device (1) according to claim 1, wherein the processor unit (6) after receiving the data for activating the input tool (3) from the input tool (3) and/or the input tool drive unit (4) Is configured to communicated with the memory unit (5) and it is configured to check whether the input is valid or not according to the current operating status of air vehicle in the direction of the data recorded in the memory unit (5).

18. A control device (1) according to claim 1, wherein when the processor unit (6) determines that the input is a valid input as a result of the control operation performed in the direction of the data stored in the memory unit (5), it is configured to operate the input tool drive unit (4) associated with said input tool (3) for the transmission of said input to the input tool on air vehicle control panel (ID) by input tool (3) to be performed by air vehicle.

19. A control device (1) according to claim 1, wherein when the processor unit (6) determines that the input is not a valid input as a result of the control operation performed in the direction of the data stored in the memory unit (5), it is configured not to operate the input tool drive unit (4) associated with said input tool (3) so that it is not transmitted to the input tool on air vehicle control panel (ID) in order to prevent the input from being carried out by air vehicle.

20. A control device (1) according to claim 1, wherein the processor unit (6) is configured to connect to the memory unit (5) after obtaining information about the current operating state of air vehicle which is configured to receive data regarding the current operating system of the air vehicle from at least one sensor to check whether air vehicle has any input matching the determined current operating state information.

21. A control device (1) according to claim 20, wherein the processor unit (6) is not to take any action unless any input is recorded in the memory unit (5).

22. A control device (1) according to claim 1, wherein the processor unit (6) after reaching at least one input record associated with the current operating state of air vehicle in the memory unit (5) as a result of the control operation performed in the memory unit (5) which is configured to operate the input tool drive unit (4) associated with the input tool (3) required to be activated for performance of said input.

\* \* \* \* \*